Figure 1:
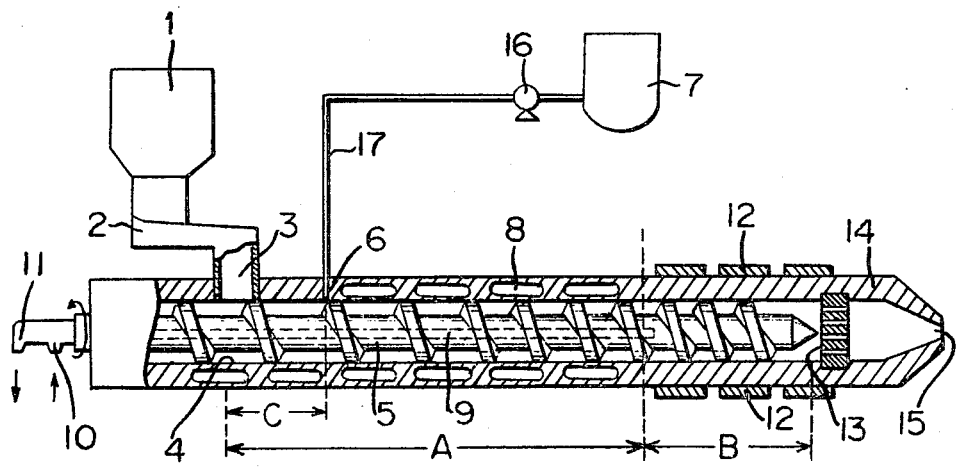

United States Patent [15] 3,679,788
Kiyono et al. [45] July 25, 1972

[54] PROCESS FOR THE PREPARATION OF THERMOPLASTIC ARTICLES CONTAINING LIQUID MATTER UNIFORMLY

[72] Inventors: Hiroshi Kiyono, Kyoto; Kohei Sugiyama, Ibaraki, both of Japan

[73] Assignee: Sekisu Kagaku Kogyo Kabushiki Kaisha, Kita-ku, Osaka, Japan

[22] Filed: May 25, 1970

[21] Appl. No.: 40,054

[30] Foreign Application Priority Data

May 26, 1969 Japan..................................44/41457

[52] U.S. Cl. ............................264/211, 264/176 R, 264/349
[51] Int. Cl. ..........................................................D01f 1/02
[58] Field of Search ...................................264/176, 211, 349

[56] References Cited

UNITED STATES PATENTS

| | | |
|---|---|---|
| 2,477,009 | 7/1949 | Sandler...................................264/349 |
| 2,530,852 | 11/1950 | Bixby.....................................260/34.2 |
| 3,538,203 | 11/1970 | Overcashier et al......................264/53 |
| 3,310,617 | 3/1967 | Dygert et al..............................264/53 |
| 3,121,914 | 2/1964 | Olson et al..............................264/211 |
| 3,177,272 | 4/1965 | Plymale..................................264/176 |

Primary Examiner—Robert F. White
Assistant Examiner—Gene Auville
Attorney—Wenderoth, Lind & Ponack

[57] ABSTRACT

A process for the preparation of thermoplastic articles containing liquid matter uniformly, which comprises feeding thermoplastic resin into the extrusion cylinder of a screw type extruder through the feeding opening, rotating the screw to transfer the resin maintained in an unmelted state, injecting the liquid matter into the unmelted resin through the at least one injection nozzle opening into the extrusion cylinder, continuously rotating the screw to mix and disperse the liquid matter in the unmelted resin and advance the mixture to the extruder outlet, and further rotating the screw to melt the mixture, and to knead and extrude the molten mixture.

8 Claims, 2 Drawing Figures

HIROSHI KIYONO and
KOHEI SUGIYAMA, Inventors

By. Wenderoth, Lind & Ponack
Attorneys

PROCESS FOR THE PREPARATION OF THERMOPLASTIC ARTICLES CONTAINING LIQUID MATTER UNIFORMLY

This invention relates to a process for making thermoplastic articles containing liquid matter uniformly, and particularly to a process for making polyvinyl butyral interlayer.

It is conventionally known that extruders, injection molding machines, or mixing rolls can be employed for making articles with liquid matter dispersed.

Particularly for the preparation of thermoplastic articles with fixed dimensional configurations, for example, film and pipe, extruders which can operate continuously and with stability are most commonly employed.

However, those conventional methods using extruders are accompanyed with various deficiencies or difficulties in manufacturing thermoplastic articles with liquid matter dispersed uniformly.

For example, when thermoplastic resin powder is simply mixed with liquid matter such as plasticizer, stabilizer and the like, using a ribbon blender or other means, and fed into the feed opening of an extruder, the liquid matter added to the resin powder can not be uniformly dispersed and the mixture becomes granular or blocky. Such mixture is unfit to be fed into the feed opening of extruder or, even if it can be fed with difficulty, its feed rate varies to render the extrusion rate non-uniform. Also the liquid matter adheres to the walls of a feed device and subsequent accumulation of the deposit seriously interferes with the feeding operation or causes notable variation in extrusion rate. Furthermore, depending on the kind of resin employed or the quantity of liquid matter, the mixture itself may become a sticky mass, which cannot be fed into an extruder without much difficulty. Particularly in the preparation of polyvinyl butyral interlayer for use as a material of laminated safety glass, it is required to add a considerable amount of liquid plasticizer to the polyvinyl butyral. In this case, simple blending of the two causes the resultant mixture to form blocks. Feeding such blocks into an extruder is extremely difficult, if not impossible, and subsequent extrusion cannot be performed without wide variation in extrusion rate.

Since simple blending is subject to the drawbacks as above-described, normally the mixture of thermoplastic resin and liquid matter is first melted and kneaded by means of mixing rolls, extrusion machines, etc., and converted into pellets or other various suitable forms, and then further fed into an extruder to be converted into the desired shaped articles.

However, this intermediate processing step for heating, kneading, melting and shaping the raw material into pellets and the like, before the step of making final products, complicates the whole process, and requires auxiliary equipment such as pelletizer, mixing rolls, etc. This obviously increases the amount of labor and inevitably adds to the cost of final products. Furthermore, the repetitive melting of the material by heating in the earlier step and final step objectionably affects the quality of final products. The thermal treatment in excess may degrade the physical properties of final products. Particularly in the previously mentioned preparation of interlayer of polyvinyl butyral, even if the mixture of polyvinyl butyral and plasticizer is converted into pellets, feeding said pellets into an extruder is still difficult due to the sticky nature of said pellets. Therefore, the multi-stage process as above-described is not suitable for such particular case, but conventionally the blocky mixture resulting from simple blending of polyvinyl butyral with plasticizer is fed into an extruder with minute care using a special feeding device, to be continuously extruded into such a suitable form that the extrudate may be continuously supplied to another extruder to be shaped into film. In such process, still the great variation in extrusion rate from the first extruder is unavoidable. Such great variations may be somewhat moderated in the course of extruding through the second extruder, but it has been impossible to confine the variation in extrusion rate to a satisfactory extent. Thus, it has been extremely difficult, in the manufacturing of the polyvinyl butyral interlayer, to eliminate the variation in extrusion rate and maintain the thickness of the sheet uniformly together with operational stability for many hours, even when such complex procedure using two extruders is employed.

As one of the extrusion methods of polyvinyl chloride and other thermoplastics, it is known to extrude powdery mixture which has been formed by the mixing process normally referred to as "dry blending," i.e., the process wherein liquid matters such as stabilizer, pigment, plasticizer and the like are added to the powdery resin, and are mixed under heating in a blender such as a Henschell mixer, to cause adsorption of the additives onto the resin powder. The mixture so formed is of dry and non-sticky powder in appearance. However, this dry blending is subject to such various limitations that the amount of liquid matter which can be added without making the resulting powdery mixture sticky is limited, and that the process is applicable only when the adsorbing ability of the resin to the liquid additives such as plasticizer is appropriate. Furthermore, since the blending is performed in a back way, the resulting mixture batches are not always of uniform quality. The qualitative dispersion which may be caused by variations in stirring conditions, heating conditions, etc. provides trouble sources in the subsequent extrusion, such as variation in extrusion rate, formation of fish eyes, etc. The process also is expensive because of the extra accommodation of blender or mixer, and auxiliary equipment thereto, as well as the labor cost required for their operation.

The dry blending process again is not applicable to the preparation of polyvinyl butyral interlayer, because the amount of plasticizer to be added is too much to keep the mixed composition dry. If the mixture is melted by heating or treating in a blender before extruding, as already mentioned, chances for foreign matter to enter the products are unduly increased, which may become fatal defect depending on the kind of product.

It is know in another process that liquid matter, particularly a readily volatile, organic solvent, is injected into the molten thermoplastic resin in the extruder. However, if the liquid plasticizer, stabilizer, and the like are injected in the similar manner, the nozzle of the liquid additives into the extrusion cylinder tends to be clogged by the molten resin. Furthermore, uniform dispersion of the liquid additives in the molten thermoplastic resin is hardly obtainable. Hence, shaped articles with satisfactory quality cannot be expected from this method. Attempts to avoid clogging of the nozzle leading into the extrusion cylinder require constant exertion of high pressure on the liquid additives to be injected, which requires high pressure equipment. Again, some improvement in the dispersion of liquid additives in the molten thermoplastic resin may be achieved by extending the kneading time in the extrusion cylinder after the injection of additives. For this purpose, however, a longer screw must be used, which inevitably increases the size of extruder. In addition to this economical disadvantage, thus prolonged kneading time of the materials in molten state objectionably affects the products' quality.

Those disadvantages are particularly serious in the preparation of polyvinyl butyral sheet for interlayer of laminated safety glass. That is, when such amount of plasticizer is injected into the heated and molten polyvinyl butyral in an extruder, dispersion of the plasticizer is unavoidably localized, more or less, and the extruded polyvinyl butyral sheet contains parts without plasticizer or parts with less plasticizer than that in the surrounding areas. Such parts are discernible as random dots of each approximately 5 mm or less in diameter, or as continuous patterns or spots, being thicker than surrounding portions. Because the parts, which are normally referred to as "fish eyes" among the trade, act as convex lens, the views through the sheet are distorted. Thus the sheet for interlayer with non-uniform dispersion of plasticizer has no commercial value.

Therefore, the main object of the present invention is to provide a process for continuously making thermoplastic articles containing liquid matter uniformly.

Another object of the invention is to provide a process for making thermoplastic articles containing liquid matter uniformly using extruder wherein the extrusion rate is stabilized, and consequently the products exhibit high dimensional stability.

A further object of the invention is to provide a process for thermoplastic articles containing liquid matter uniformly with ease, by simplified steps and with very simple equipment.

The foregoing objects and advantages are accomplished by the process comprising feeding thermoplastic resin into the extrusion cylinder of a screw type extruder through the feed opening, rotating the screw to transfer the resin maintained at unmolten state, injecting liquid matter into the unmelted resin through the at least one injection nozzle opening into the extrusion cylinder, continuously rotating the screw to mix and disperse the liquid matter in the unmelted resin while advancing the mixture towards the extrusion cylinder outlet, and further continuing the rotation of said screw to melt the mixture, and to knead and extrude the molten mixture.

The thermoplastic resins useful for the present invention are not limited to any specific kind, but all known thermoplastic resins such as polystyrene, polyvinyl chloride, polycarbonate, polyester, polyamide, polyethylene, polypropylene, acrylonitrile-butadiene-styrene copolymer, ethylene-vinyl acetate copolymer, ethylene-vinyl chloride copolymer, acrylonitrile-styrene copolymer, polymethyl methacrylate, polyvinyl butyral, and poval resins, can be employed.

The preferred form of such resins to be supplied to the extrusion cylinder is as a powder, in which other known blending materials such as lubricants, fillers, pigments, dyes and the like may be suitably contained.

In the present invention, the "liquid matters to be injected into thermoplastic resin" refers to the liquid additives used as plasticizer, stabilizer, solvent, etc., which may be added as mixture of more than one kind of liquid additive. If such liquid additives possess the ability of dissolving lubricants, dyes, pigments, and the like additives, the latter can be added to the former beforehand instead of adding said additives to the thermoplastic resin. In that case, the resulting solution is dispersed in the thermoplastic resin.

According to the present invention, the pressure in the vicinity of liquid matter-injection nozzle in the extruder is substantially atmospheric, since the thermoplastic resin supplied is not melted and not pressurized. Therefore, injection of highly volatile liquid matter which tends to be gasified under atmospheric pressure at around room temperature is not recommendable, because such liquid will be gasified after injection and escape from the feed opening of an extruder.

Kinds of the plasticizer, stabilizer and the like to be employed in the present invention are not confined, insofar as they are liquid. Any matter which is of solid at room temperature but can be liquefied by heating may be injected into the extruder. Thus plasticizer, stabilizer and the like can be suitably selected for each practice, in consideration of a kind of thermoplastic resin employed.

Examples of plasticizers include esters of phthalic acid such as dimethyl phthalate, diethyl phthalate, dibutyl phthalate, etc.; esters of phosphoric acid such as tributyl phosphate, tricresyl phosphate, diphenyl 2-ethylhexyl phosphate, etc., esters of dibasic acids such as dibutyl adipate, di(2-ethylhexyl) adipates, di-(2-ethylhexyl) sebacate, etc.; glycol esters such as triethylene glycol di-(2-ethyl butyrate), triethylene glycol di-(2-ethyl hexoate), etc.; esters of fatty acids such as butyl stearate, butyl oleate, etc.; and the like.

As the liquid stabilizers, for examples organic tin compounds such as dibutyl tin dilaurate, dibutyl tin distearate, dibutyl tin maleate, etc.; and compounds of other metals with organic acids, e.g., barium phenolate, cadmium octoate, etc., may be employed. Other commercially available stabilizers may also be suitably selected and used depending on the kind and utility of thermoplastic resin, insofar as they are liquid.

The kinds and amounts of liquid matter such as plasticizer and stabilizer as above-described are subject to no critical limitations according to the present invention. Such kinds and amounts of the liquid matters which, if simply blended with thermoplastic resin powder, will render the mixture blocky or sticky, or will render the pellets formed from the mixture sticky, or will render the dry blending of the mixture impossible, can be employed in the present invention without any detrimental effect.

Particularly in the preparation of interlayer for laminated safety glass from polyvinyl butyral, considerable amounts of plasticizer, e.g., approximately 30 – 50 parts by weight per 100 parts by weight of polyvinyl butyral, are used. The plasticizers useful for this purpose include, for example, dibutyl sebacate, triethylene glycol di(2-ethyl butyrate), triethylene glycol di(2-ethyl hexoate), di($\beta$-butoxyethyl) adipate, etc., and such compounds which are diesters of 1,2-di-(2-carboxyethoxy) ethane and alkylalcohol expressed by the formula, $R_1OOC-(CH_2CH_2O)_2-CH_2CH_2COOR_2$ (in which $R_1$ and $R_2$ are alkyl radicals of one to 12 carbons). The laminated safety glass with polyvinyl butyral interlayer employing the latter compound as plasticizer exhibits excellent resistance to piercing force and high transparency.

The polyvinyl butyral interlayer is occasionally provided with various colors such as red, blue, yellow, violet, etc., depending on the intended use. Any of dyestuffs such as anthraquinone dyes, azo dyes, and basic dyes which are soluble in the employed plasticizer can be dissolved in the plasticizer at a suitable ratio, to be together injected into the extruder and to achieve such coloring.

When the present invention is carried out using single screw extruder, transferring the mixture of the thermoplastic resin with the liquid matter through the extrusion cylinder may not be carried out smoothly, due to various factors such as the kind of particular resin employed, kind and amount of liquid matter, screw speed and others. Thus in certain cases the single screw extruder fails to extrude the mixture. For this reason, use of twin screw extruder is preferred for the present invention.

According to the present invention, it is required that thermoplastic resin should be maintained in unmolten state during mixing with liquid matter in the extrusion cylinder. Undesirable temperature rise of the resin in the extrusion cylinder at the mixing zone may be caused by heat transfer from the heat-melting zone of the extruder and autogeneous heat of the resin due to friction incurred by the mixing action. It is, therefore, necessary to prevent the thermoplastic resin from melting under such temperature rise. It is a practical and preferred means to achieve this purpose, to forcibly cool certain portions of cylinder and screws at which the resin should be maintained un-molten, with suitable coolant such as water.

The liquid matter injected into the specific zone of the extrusion cylinder at which the thermoplastic resin is maintained unmelted is mixed with, or dispersed into, said resin by the rotation of extruding screw. The mixture of said unmolten resin and liquid matter is continuously and further thoroughly mixed, while being transferred to the heat-melting zone in the extruder. The mixture at the area immediately preceding the heat-melting zone must be a homogeneous mixture. That is, by the time the mixture reaches said area, the mixing must have been accomplished so that the liquid matter may be substantially uniformly dispersed in the powdery or fine particulate thermoplastic resin. Favorable results cannot be expected if the powdery or particulate resin locally contains different portions of higher or lower liquid contents than the surrounding portions.

Subsequently, in kneading and melting the resultant homogeneous mixture, means known per se, such as use of an external electric heater to raise the temperature of the thermoplastic resin above its softening point or increase in compression ratio of the screws to melt the mixture by frictional heat, may be suitably employed. The mixture thus kneaded and melted in the extrusion cylinder is transferred into a mold through the outlet of the extruder, wherein said mixture can be shaped into desired configuration and extruded.

Hereinafter one example of the apparatus useful for embodying the present invention will be explained, referring to the attached drawings.

Figure 2:
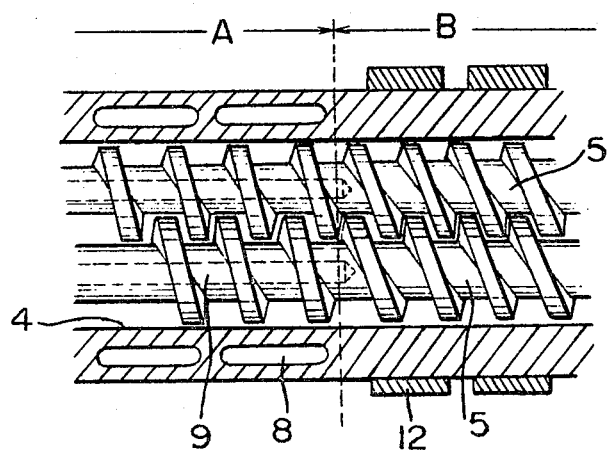

FIGS. 1 and 2 illustrate the embodiment of the invention with a twin screw extruder, in which the same numerals denote identical parts.

In the drawings, 1 is hopper in which the optional amount of powdery thermoplastic resin may be stored, said resin optionally containing suitable amount of other additives such as filler, stabilizer, pigment, dyestuff, etc. which also are normally powdered. The resin in hopper 1 can be supplied into the cylinder 4 through feed opening 3, by the predetermined amount measured by the quantitative supply device 2. The numerals 5, 5 denote parallely installed two screws. When said screws 5, 5 are rotated, the thermoplastic resin is concurrently mixed and transferred toward the exit 15 formed at the head of the cylinder 4. The liquid matter such as the plasticizer, stabilizer, solvent, etc., stored in the reservoir tank 7 is injected into the cylinder 4 through the conduit 17 and injection nozzle 6, by the action of measuring pump 16, to be mixed with the powdery thermoplastic resin. A circulation passage 8 for the coolant such as water is provided with the walls of cylinder 4. The resin is maintained unmolten by cooling medium circulated through the passage 8, while being mixed with the liquid matter. As the rotation of screws 5, 5 is continued, the liquid matter is uniformly dispersed in the unmolten thermoplastic resin. The cooling medium such as water is supplied through the inlet 10 at the rear end of the screws 5, 5, into the cooling bore 9, 9 provided at the central portions of the screws 5, 5, and is discharged through the outlet 11, after cooling the screws 5, 5.

At the portions of cylinder 4 wherein the circulation passages 8 of coolant are provided and those of the screws 5, 5 wherein the cooling bores 9, 9 are formed, the thermoplastic resin under mixing is maintained unmolten, and the liquid matter is uniformly dispersed by the rotation of screws 5, 5. Normally the preferred effective length, $L_A/D$, of the screw in zone A in which the resin is maintained unmolten is no less than 5. In order to achieve the uniform dispersion of the liquid matter in the resin powder, the effective length over 9 may be unnecessary. The distance C from the feed opening 3 to the liquid-injection nozzle 6 may be expressed by the effective length, $L_C/D$, of the screw, which preferably ranges from 0.5 to 1. Because the transfer of the resin supply through the extrusion cylinder becomes nearly constant at the approximate distance, $L/D = 0.5$ from the feed opening 3. If the injection nozzle 6 is located closer to the feed opening 3 than said distance, there is undesired possibility that the injected liquid matter may flow backward to the feed opening 3 to cause variation in supply rate of thermoplastic resin. Whereas, greater distance than $L/D = 1$ between the injection nozzle 6 and feed opening 3 is undesirable, because such will shorten the screw length effective for mixing the resin with liquid matter in the zone A wherein the thermoplastic resin is maintained unmolten. In the drawings, 12 is the heater installed on the external side of cylinder 4. The thermoplastic resin in zone B of the extrusion cylinder is heated by the heater 12 and melted. In a twin screw extruder as illustrated in FIGS. 1 and 2, the effective length, $L_{A+B}/D$, of the screw from the feed opening 3 to the screw tip may range from approximately 10 to 15 with satisfactory result. Also the satisfactory effective length of the screw in zone B, i.e., $L_B/D$, is no less than 4.

Further, referring to the drawings, 13 is the breaker plate, 14 is the extruder head, and 15 is the exit of extrudate which is connected with a suitable mold not shown. The molten resin is extruded through the exit 15 to desired configuration as extruded through said mold.

According to the present invention, the ratio of volume of the thermoplastic resin to the clearance volume per one pitch of screws at the zone A, preferably is within the range of 1/7 to ¾. When it is less than 1/7, the resin supply into the extruder is too little to maintain the sufficient extrusion efficiency. Whereas, if it is greater than ¾, there is a possibility that the thermoplastic resin in zone A is melted due to the autogeneous heat caused by friction or compression.

There is a tendency that greater injection speed of the liquid matter through the injection nozzle 6 assists better mixing of the unmolten thermoplastic resin with the liquid matter. Therefore, the preferred injection speed is not less than 50 cm/sec. Whereas, high injection speed in excess is not necessary in obtaining satisfactory result. In consideration of the load on pump 16 and other factors, injection speed up to 300 cm/sec. can be satisfactorily employed. Thus the preferred injection speed of 50 to 300 cm/sec. can be attained by the adoption of an injection nozzle 6 with suitable diameter which can secure the supply of suitable amount of the liquid matter for the thermoplastic resin. If the nozzle diameter is too small, it may be clogged by foreign matter. Therefore normally preferred nozzle diameter ranges approximately 0.5 - 4 mm. Obviously, large nozzle diameter in excess is undesirable because it causes undue reduction in injection speed of the liquid matter. The number of injection nozzle provided with the extruder is normally one or two, and two injection nozzles may be particularly preferred for twin screw extruder. Too many injection nozzles will reduce the injection speed at each nozzle, because the total amount of liquid supply is fixed. The portions around injection nozzle 6 are not pressurized, but substantially atmospheric. Therefore the injection of liquid matter can be carried out without using any special high pressure equipment.

As heretofore described, since the present invention comprises extruding thermoplastic resin using a screw type extruder, injecting liquid matter into the zone wherein the thermoplastic resin is maintained unmolten and the liquid matter is dispersed in the resin by mixing, and kneading and melting the resulting mixture in the course of the following extrusion, thus shaped articles obtained contain the liquid matter as uniformly dispersed therein. Therefore, the process according to present invention enables continuous preparation of such products, stably maintaining the state of excellent dispersion for many hours. According to the invention, the resin can be fed at constant rate. Consequently the extrusion rate is stable, and articles of high dimensional stability can be manufactured.

Furthermore, the present invention requires none of the incidental equipment employed in the conventional processes such as blender, pelletizer, mixing rolls, etc. Since the manufacturing procedure is so simplified, the operational cost can be advantageously reduced.

Further, as the result of omission of such preliminary steps as blending and pelleting, chances for foreign matter to enter into the manufactured articles can be reduced. This is a valuable advantage for the preparation of transparent articles. Elimination of repetitive heat-melting again can contribute to qualitative improvement of products, because the thermal treatments given to the thermoplastic resin are reduced.

Still another advantage of the present invention is that, while it has been difficult for the conventional processes employing blending, pelleting, etc., to switch the grade of product quickly by changing kind or amount of coloring agent, plasticizer, etc., because such pretreatment has been carried out in a batch method, present process can be very easily carried out to overcome such disadvantages. That is, according to the invention, kind and amount of liquid matter such as plasticizer can be readily changed, and color change also can be effected simply by changing the coloring agent which may be added to the plasticizer.

This invention is particularly useful for the preparation of polyvinyl butyral interlayer. Since the process enables uniform dispersion of liquid plasticizer in polyvinyl butyral, formation of fish eyes which is a fatal defect for interlayer can be prevented. Also the constant feed rate maintains the extrusion rate constant, consequently stably maintaining the uniform thickness of the product. As already mentioned, reduced chances for entrance of foreign matter are advantageous for the preparation of transparent interlayers. Easy and quick color changing as well as the simplification of equipment and procedures achieved by the subject process of course are also valuable improvements in the preparation of polyvinyl butyral interlayer.

Hereinafter the embodying examples according to the present invention will be given, together with referential controls.

EXAMPLE 1

In this example, approximately 65 mol percent acetalized, powdery polyvinyl butyral of approximately 1,000 in average degree of polymerization was mixed with triethylene glycol di(2-ethyl butyrate) as the plasticizer, at a weight ratio of 40 parts of the latter per 100 parts of the former. The extrusion was effected through a twin screw extruder illustrated in FIGS. 1 and 2.

More particularly, in the extruder used in this Example, the effective length, L/D, of each screw was 13, the cylinder diameter was 100 mm, the ratio of zone A, wherein the resin was maintained unmelted, to heat-melting zone B was 9 : 4, and the distance between the resin feed opening 3 and liquid-injection nozzle 6 (L/D) was 1. Two injection nozzles 6 having diameter 1 mm were provided.

The polyvinyl butyral was fed through the feed opening 3, and the plasticizer was injected into the cylinder by the action of pump 16, at an injection speed of approximately 210 cm/sec. through each nozzle.

The resin temperature at the boundary of zones A and B was 70° C. That is, the resin temperature in zone A was maintained at the range of room temperature to 70° C., and in said zone the polyvinyl butyral maintained in unmolten state was thoroughly mixed with the injected plasticizer. Then the mixture was sent into zone B, heated, melted, and kneaded, and extruded through a flat die at the extruding rate of 40 kg/hr. The resin temperature at the resin exit 15 was 150° C.

From thus formed film sheet, 10 samples of each 30 cm × 30 cm in size were taken to be examined for the presence of fish eyes. No fish eyes were discovered.

Also from each of the above samples, two samples of each 5 mm × 5 mm in size were taken, and the total of 20 samples were measured for their density with a density-gradient tube. As the result, all the samples were found to be of substantially equal density, as indicated in Table 1. This fact reveals the uniform dispersion of the plasticizer in polyvinyl butyral.

TABLE 1

| Sample No. | Density (g/cc) | Sample No. | Density (g/cc) |
|---|---|---|---|
| 1 | .0684 | 11 | 1.0681 |
| 2 | .0687 | 12 | 1.0687 |
| 3 | .0684 | 13 | 1.0683 |
| 4 | .0684 | 14 | 1.0684 |
| 5 | .0684 | 15 | 1.0682 |
| 6 | .0687 | 16 | 1.0684 |
| 7 | .0682 | 17 | 1.0684 |
| 8 | .0682 | 18 | 1.0680 |
| 9 | .0680 | 19 | 1.0682 |
| 10 | .0682 | 20 | 1.0682 |

$\overline{X} = 1.0683$
$\sigma = 0.00020$

CONTROL 1

The same materials of the same amount as specified in Example 1 were extruded into a film through the identical twin screw extruder and flat die with those employed in Example 1, at an extruding rate of 40 kg/hr. The practice was differentiated from Example 1 by the following points, i.e., while the effective length of the screws, L/D, was 13 and the cylinder diameter was 100 mm, the ratio between the zone A, wherein the resin was maintained unmelted, to the heat-melting zone B was made 3:10, and the two injection nozzles provided on the cylinder as spaced from the resin feed opening 3 by the distance (L/D) of 1 were given a diameter of 6 mm each. Through each injection nozzle, the plasticizer was injected at a speed of approximately 6 cm/sec.

As the result it was confirmed that, because the length of zone A was very short in this Control, the injected plasticizer was not well dispersed in the unmelted resin before it reached the zone B wherein the resin was heated and melted.

Ten samples of 30 cm × 30 cm each were taken from thus formed film and examined. On the average, 12 fish eyes of 1–3 mm in diameter were found in each sample. When 20 samples of 5 mm × 5 mm each were taken from the first 10 samples in the manner similar to Example 1, and measured of their density, the results as indicated in Table 2 below were obtained. As demonstrated by the given data, thus measured densities shown some dispersion, which indicates non-uniform distribution of the plasticizer.

TABLE 2

| Sample No. | Density (g/cc) | Sample No. | Density (g/cc) |
|---|---|---|---|
| 1 | .0692 | 11 | 1.0673 |
| 2 | .0673 | 12 | 1.0702 |
| 3 | .0687 | 13 | 1.0671 |
| 4 | .0671 | 14 | 1.0692 |
| 5 | .0671 | 15 | 1.0669 |
| 6 | .0714 | 16 | 1.0678 |
| 7 | .0674 | 17 | 1.0667 |
| 8 | .0674 | 18 | 1.0684 |
| 9 | .0669 | 19 | 1.0706 |
| 10 | .0698 | 20 | 1.0664 |

$\overline{X} = 1.0681$
$\sigma = 0.00143$

CONTROL 2

In this Control, a twin screw extruder in which the effective screw length, L/D, was 17, cylinder diameter was 100 mm, and the ratio of zone A to zone B was 4:13, was employed. The same polyvinyl butyral and the plasticizer of the same amounts as used in Example 1 were extruded through a flat die into a film sheet, at an extruding rate of 40 kg/hr. The plasticizer was injected into the heated and molten resin through a nozzle located as spaced from the resin feed opening by the distance L/D, of 5, at a weight ratio of 40 parts per 100 parts of the resin, and at an injection rate of approximately 3.2 g/sec.

Ten samples of 30 cm × 30 cm each in dimensions were taken from the resulting film. Upon examining the samples, on the average 25 fish eyes of each 1 – 5 mm in diameter were discovered per one sample. A film with so many fish eyes is of no value as interlayer for laminated safety glass.

We claim:

1. A process for the preparation of thermoplastic articles containing a plasticizer therefor uniformly dispersed therein, which comprises feeding a powdery thermoplastic polyvinyl butyral resin into the extrusion cylinder of a twin screw extruder through the feed opening, rotating the screw to transfer the resin maintained in an unmelted state towards the outlet, injecting a plasticizing amount of plasticizer into the unmelted resin through the at least one injection nozzle opening into the extrusion cylinder at substantially atmospheric pressure, continuously rotating the screw to uniformly mix and disperse the plasticizer in the unmelted resin, and further rotating the screw to melt the mixture and advance it towards the outlet, and to knead and extrude the molten mixture.

2. The process of claim 1, in which the injection speed of the plasticizer is not less than 50 cm/sec.

3. The process of claim 1, in which the ratio of volume of the thermoplastic resin to the clearance volume per one pitch of screws at the zone wherein the resin is maintained unmelted, ranges from 1/7 to ¾.

4. The process of claim 1, in which the size of the zone in which the thermoplastic resin is maintained unmelted is, when expressed by L/D, at least 5.

5. The process of claim 1, in which the distance between the feed opening for thermoplastic resin and the injection nozzle for plasticizer ranges, when expressed by L/D, from 0.5 to 1.

6. The process of claim 1, in which the size of the zone wherein the mixture of thermoplastic resin and plasticizer is heated, melted and kneaded is, when expressed by L/D, at least 4.

7. The process of claim 1, wherein the plasticizer is employed in amounts of approximately 30 to 50 parts by weight per 100 parts by weight of polyvinyl butyral.

8. The process according to claim 1, wherein the extruder has two zones, a mixing zone adjacent to the feed opening and adjacent to said mixing zone, a heating-melting zone leading to the extruder outlet, the mixing zone temperature being controlled by a cooling means to prevent said thermoplastic from melting before being transferred to the heating-melting zone.

* * * * *